Patented Sept. 2, 1924.

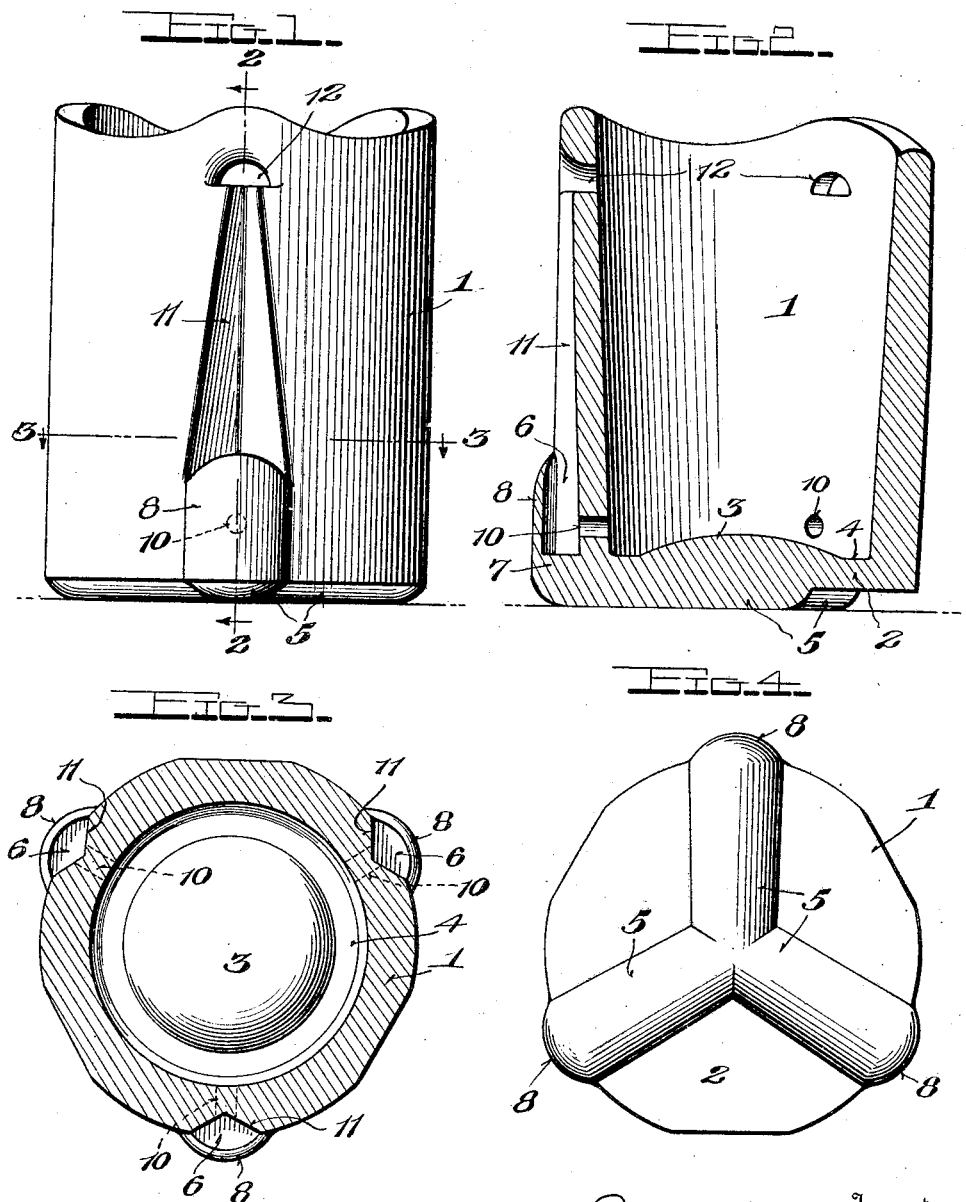

1,507,202

UNITED STATES PATENT OFFICE.

JOHN H. PETTIT AND JOHN J. FITZPATRICK, OF VIENNA, WEST VIRGINIA.

FLOWERPOT.

Application filed November 15, 1923. Serial No. 674,855.

*To all whom it may concern:*

Be it known that we, JOHN H. PETTIT and JOHN J. FITZPATRICK, citizens of the United States, residing at Vienna, in the county of Wood and State of West Virginia, have invented certain new and useful Improvements in Flowerpots, of which the following is a specification.

This invention relates to certain new and useful improvements in flower pots and the primary object thereof is to provide improved means for continuously supplying air to the roots of the plants and for also enabling water to be supplied to the roots or at the base of the earth, as desired.

A further object of the invention is to provide a flower pot which embodies means integral therewith for performing the usual function of a saucer and which also acts to hold the bottom of the pot spaced above the surface of the support on which the pot is placed, so as to enable air to have free access to the pot bottom.

A still further object of the invention is to provide a flower pot which can be easily and economically produced, as by moulding, and one wherein the air and water supplying means lie closely adjacent to the pot periphery, so as to avoid the presence of projections subject to easy breakage.

Another object of the invention is to provide a pot which embodies the foregoing recited objects, and which at the same time is artistic and ornamental.

The invention has still further and other objects which will be later set forth and manifested in the course of the following description.

In the drawings:

Figure 1 is a side elevation of a flower pot constructed in accordance with the present invention;

Figure 2 is a section on line 2—2 of Figure 1;

Figure 3 is a section on line 3—3 of Figure 1, and Figure 4 is a bottom plan view.

In proceeding in accordance with the present invention, a body 1 is employed which has a bottom 2 provided on its upper face with a rounded projection 3 which latter affords a circular channel 4 in conjunction with the side walls of the body. The under face of the bottom is provided with a series of elongated supporting feet 5, the latter radiating from the center of the bottom and being rounded along their sides.

The side walls of the body are provided with a series of vertical wells 6, which latter preferably are of the same number as the feet 5 and are in register with the latter, their bottom walls 7 being formed by the upper faces of the outer ends of the feet, so that the latter reinforce and form thickened bottoms for the wells as clearly shown in Figure 2. The outer vertical walls 8 of the wells are curved and merge into the side walls of the body 1, projecting but slightly beyond the latter so as to be protected by the side walls against breakage, the object being to have the walls 8 lie as nearly within the periphery of the pot as possible to avoid projections subject to easy breakage. The upper free end edges of the well walls 8 are rounded as shown in Figures 1 and 2. Lateral ports 10 are formed in the side walls of the pot to establish communication between the wells and the pot interior.

The outer faces of the side walls of the pot body are formed with vertical channels 11 which are in register with the wells. The channels are of V-cross section and of downwardly flaring and inwardly and downwardly inclined formation, their wide lower end portions being of substantially the width of the wells and merging into the latter. Apertures 12 are formed in the upper end portions of the side walls of the body so as to enable the use of suspension chains or means in cases where swinging of the pot is desired.

In use it will be noted that the earth will seat on the projection 3, and a relatively narrow annular portion thereof will project within the channel 4. Water poured into the wells will accordingly be more readily absorbed by this thin depending portion of the earth which occupies the channel 4.

It will also be observed that the channels 11 function to enlarge the wells so as to more readily admit the pouring spout of a water can or to otherwise allow water to be poured thereinto. The feet 5 allow air to have free access to the pot bottom and also cooperate with the rounded portion 3 to provide the pot with a strong and substantial bottom which resists breakage.

The vertical channels 11 also permit a larger amount of air to enter the wells and pass through the ports 10 to gain access to the plant roots. The wells also serve to trap any excess water which may seep through the body of earth in instances of where the water is supplied to the body of earth at the surface thereof, and further convey excess water which may overflow through the openings 12 into the wells.

What is claimed is:—

1. In a flower pot, a body having a raised rounded portion on the upper face of its bottom to form a circular channel in conjunction with the side walls of the body, and a series of elongated spaced radial feet extending from the center of the bottom and projecting at their outer ends beyond the periphery of the body, vertical walls extending upwardly from the projecting outer ends of the feet and merging into the side walls of the body to form wells, the body being formed with parts establishing communication between the wells and the body interior and the outer face of the side walls of the body being formed with vertical grooves of substantially V-cross section which flare downwardly and incline inwardly and lie opposite to the well walls.

2. In a flower pot, a body, and a relatively narrow substantially semi-circular vertical wall extending upwardly from the bottom portion of the body and disposed closely adjacent to but spaced from the body periphery and having its sides integrally merging into the latter, the body periphery being grooved at points opposite to the wall so as to cooperate with the latter to form a well, the body having an opening adjacent its bottom establishing communication between the well and the interior of the body.

3. In a flower pot, a body having a series of spaced radial feet merging at their inner ends at the center of the bottom of the pot and projecting at their outer ends beyond the periphery of the body, vertical walls extending upwardly from the outer ends of the feet and disposed substantially parallel to the body periphery and closely adjacent thereto and having their side integrally merging into the periphery of the body, the periphery of the body being grooved opposite to the walls to form wells in conjunction with the walls, the bottoms of the wells being formed by the upper faces of the projecting outer ends of the feet, the body having openings adjacent its bottom extending into the wells.

4. In a flower pot, a body, and a series of vertical walls extending upwardly from the bottom portion of the body and disposed in spaced relation to the latter and having their sides merging into the body, the upper end portions of the body being formed with openings and the body periphery having grooves which lead from the openings to points alined with the lower ends of the walls, the body having ports leading into the wells formed by the walls and the parts of the grooves adjacent to the walls.

In testimony whereof we affix our signatures.

JOHN H. PETTIT.
JOHN J. FITZPATRICK.